United States Patent [19]

Fagerquist

[11] Patent Number: 4,994,821

[45] Date of Patent: Feb. 19, 1991

[54] CONTINUOUS INK JET PRINTER APPARATUS HAVING IMPROVED SHORT DETECTION CONSTRUCTION

[75] Inventor: Randy L. Fagerquist, Dayton, Ohio

[73] Assignee: Eastman Kodak Company, Rochester, N.Y.

[21] Appl. No.: 408,578

[22] Filed: Sep. 18, 1989

[51] Int. Cl.[5] .............................................. G01D 18/00

[52] U.S. Cl. ........................................................ 346/75

[58] Field of Search .......................................... 346/75

[56] References Cited

U.S. PATENT DOCUMENTS

| | | | |
|---|---|---|---|
| 4,171,527 | 10/1979 | Osborne et al. | 346/75 |
| 4,439,776 | 3/1984 | Zeiler | 346/75 |
| 4,616,234 | 10/1986 | Wint | 346/75 |
| 4,928,115 | 5/1990 | Fagerquist et al. | 346/75 |

*Primary Examiner*—Bruce A. Reynolds
*Assistant Examiner*—Gerald E. Preston
*Attorney, Agent, or Firm*—John D. Husser

[57] ABSTRACT

A short detection system for a continuous ink jet printer includes an electrically conductive sensor element located along an ink egress passage of the printer's catcher; a dielectric surface formed along the drop impact region of the catcher, between the drop electrodes and the sensor element; and signal circuit responsive to a charge polarity reversal output by the sensor for signalling a charge electrode short condition.

2 Claims, 3 Drawing Sheets

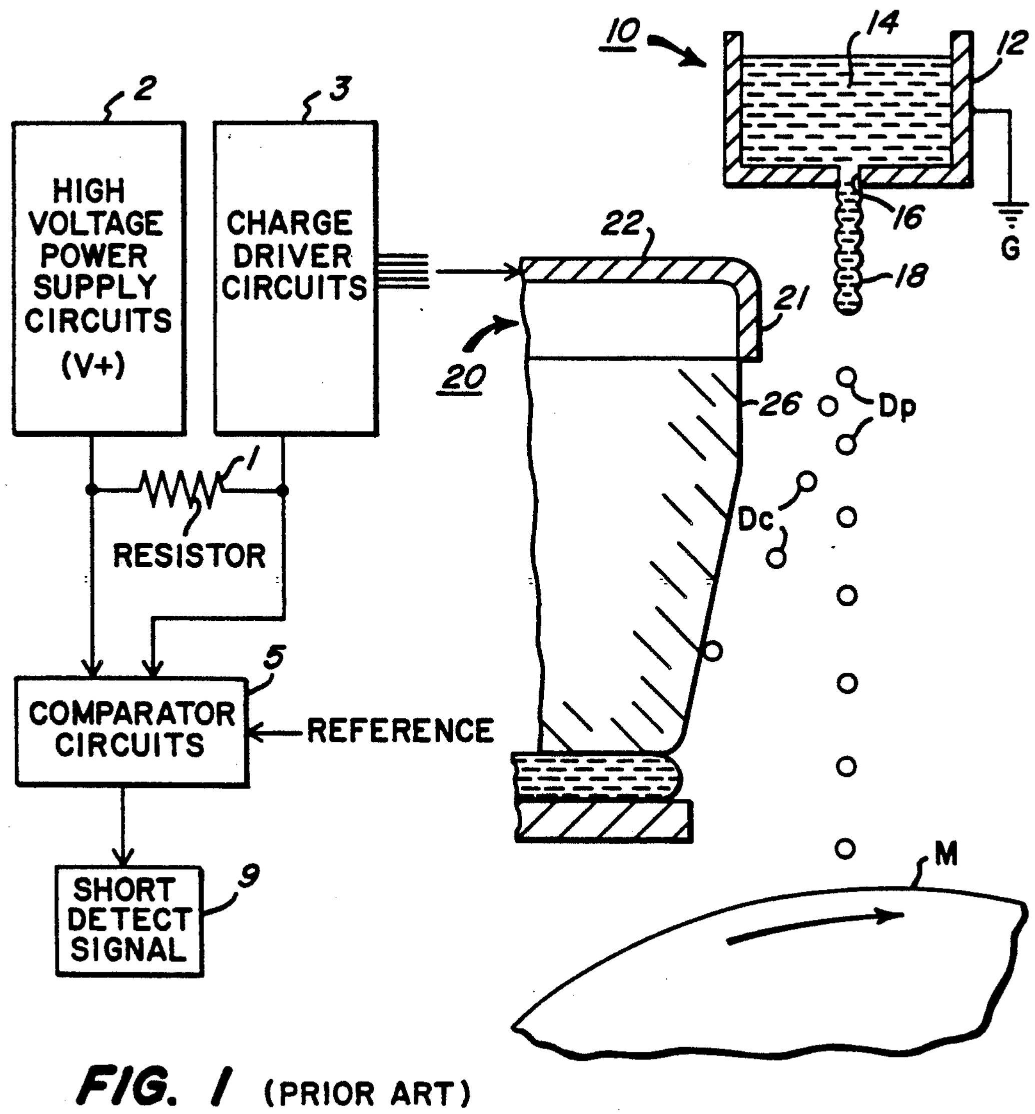
FIG. 1 (PRIOR ART)
FIG. 2 (PRIOR ART)
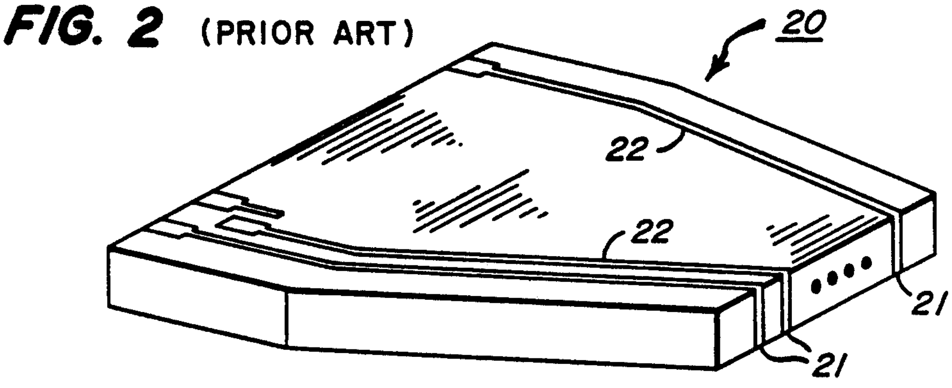

CONTINUOUS INK JET PRINTER APPARATUS HAVING IMPROVED SHORT DETECTION CONSTRUCTION

FIELD OF THE INVENTION

The present invention relates to continuous ink jet printers and, more particularly, to print head and circuit constructions that enable improved detection of the shorting of the print head's drop charge electrodes.

BACKGROUND OF INVENTION

In continuous ink jet printers of the binary kind, a print head directs a plurality of electrically conductive ink drop streams, past respective charge electrodes, toward a print zone. The charge electrodes are located opposite the drop's break off region and are selectively energized or non energized to a predetermined voltage level (in accord with information signals) to induce an opposite polarity charge, or no charge, on the adjacent ink drops. The drops that are induced with a charge of opposite polarity (i.e. opposite the electrode voltage polarity) are deflected to a downstream, catcher portion of the print head. Non-charged drops pass onto the print medium.

If one or more of the ink jet streams becomes misdirected (e.g. by a dirt particle caught in its orifice). the electrically conductive ink can accumulate on the charge electrode surfaces and cause a conductive path between the electrode surface and an electrically grounded portion of the printer (often the orifice plate). The electrodes, their leads and the ink offer a low resistance path so that a significant "shorted circuit" current can develop quickly, and damage the electrodes (and in some instances the orifice plate).

One prior art approach for detecting such shorted circuit is illustrated in FIG. 1. Thus, a resistor 1 is placed in series with the high voltage supply 2 and the high voltage input terminal of the charge electrode driver circuitry 3. The output leads of the charge electrode driver circuit are connected to the charge electrode leads 4. These leads normally show a high resistance to ground potential, as they are molded into an epoxy substrate which has a very large resistivity. Therefore, the electrical current carried by the charge leads during nominal printing operations of a print head is negligible, typically much less than 1 microamp.

In the event a shorted circuit current flows through one or more of the charging leads, a voltage will develop across the resistor 1. This voltage is compared to a predetermined reference potential by a comparator circuit 5. If the voltage across resistor 1 is larger than a reference potential, the comparator circuit will output a signal enabling a sequence of system shut down instructions, e.g. including switching off of the high voltage power supply and ink jets. If the voltage across resistor 1 is less than the reference potential, then the printer is allowed to operate normally.

A major disadvantage of the FIG. 1 approach for ink jet short detection is the relatively large current (e.g. 0.5 to 1.0 milliamp) which must flow through the charging lead(s) in order to initiate a system shut down. Currents of this magnitude are capable of causing charge plate lead and/or orifice plate damage; however, such large threshold currents are necessary because of spurious electrical noise on the high voltage power supply line. If the comparator circuit is designed to be triggered by significantly smaller short circuit current, the noise signals can initiate an unwanted system shut down. When false shut downs become a chronic problem for the user, an unnecessary print head replacement may be made.

Another problem is that the FIG. 1 detection system can only be used at periodic test intervals, and not when printing information is being imparted to the charge electrodes. This prior art approach therefore requires a complicated hardware counting procedure for controlling, sampling and interpreting its short detection circuit. U.S. Pat. Nos. 4,171,527 and 4,439,776 disclose other examples of detection circuits which suffer similar disadvantages.

Commonly assigned U.S. patent application Ser. No. 265,102, filed Oct. 31, 1988, now U.S. Pat. No. 4,928,115 and entitled "Continuous Ink Jet Printer Having Remotely Operable Print Head Assembly" discloses a continuous ink jet printer device which, among other features, includes a catcher having a dielectric drop impact surface and an electrically conductive drop discharge portion. This configuration enables the electrical current, created by caught droplets, to be detected by an electrometer coupled to a discharge portion of the catcher. The electrometer is employed during start-up procedures to detect and adjust the phase relation between drop generation and the drop charge signal, e.g. in accord with the method of U.S. Pat. No. 4,616,234. The print head of the Ser. No. 265,102 application, now U.S. Pat. No. 4,928,115 utilized the short detection approach shown in FIG. 1.

SUMMARY OF INVENTION

One significant purpose of the present invention is to provide, for continuous ink jet printers, improved print head and detection circuit constructions which avoid the disadvantages of prior art approaches and allow more sensitive, and more frequent, detection of shorted, drop charge electrodes. Thus, one advantage of the present invention is that the current needed to detect a short condition is drastically lower than the prior art approaches. Another advantage of the present invention is that the existence of an electrode short condition is continuously monitored. A further advantage of the present invention is that it can be configured in structural embodiments useful also for phase detection in accord with the above cited U.S. Pat. No. 4,616,234 and application Ser. No. 265,102, now U.S. Pat. No. 4,928,115.

In one aspect, the present invention constitutes an improved short detection system for use with a continuous ink jet printer of the kind having a means for generating a plurality of droplet streams, a plurality of electrodes for selectively charging droplets of such streams and means for catching the charged, non print droplets. The detection system comprises (i) an electrically conductive sensor element located along an ink egress passage of the catching means; (ii) a dielectric surface formed along the drop impact region of the catching means, between the charge electrodes and the sensor element; and (iii) signal means responsive to a charge polarity reversal output by the sensor for signalling a charge electrode short condition.

BRIEF DESCRIPTION OF DRAWINGS

The subsequent description of preferred embodiments refers to the accompanying drawings wherein:

FIG. 1 is a schematic side view illustrating the above discussed, prior art ink jet printer and short detection system;

FIG. 2 is a perspective view illustrating the charge plate portion of the FIG. 1 apparatus;

DETAILED DESCRIPTION OF PREFERRED EMBODIMENTS

Figure 3:
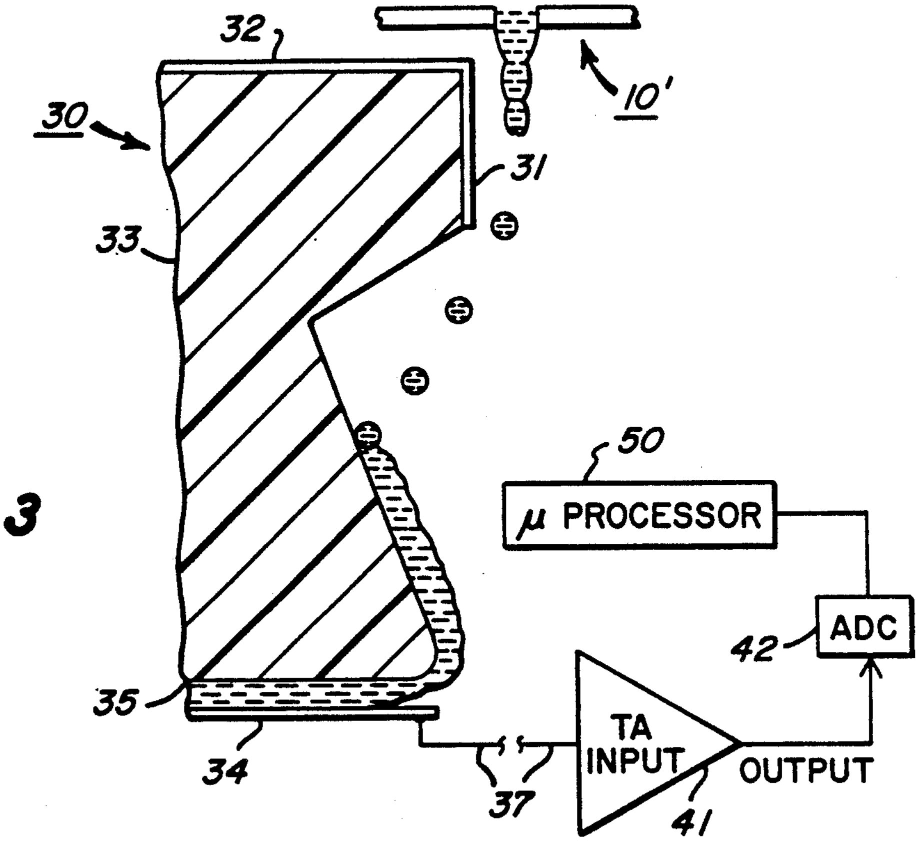
FIG. 3 is a side view of one preferred print head construction in accord with the present invention, operating in a nominal printing mode.

Referring again to the prior art system schematically shown in FIG. 1, as well as in FIG. 2, it can be seen that the drop generator assembly 10 of the continuous ink jet print head includes an ink supply manifold 12 from which ink 14 is ejected under pressure, via an array of orifices 16, to form a plurality of ink filaments 18. As shown the print head is controlled so that drop break off from the filaments occurs opposite the charge electrodes 21 of the charge plate assembly 20. Driver circuits 3 are selectively activated to transmit high voltage V+ from source 2 to charge electrodes (via leads 22), in a timed relation with drop break off so that an opposite polarity charge is induced on non print (or caught) drops $D_c$. Non-charged, print drops $D_p$ pass onto the print medium M. As explained above, a short detection signal is provided by device 9 when a current, e.g from charge electrodes 21 or leads 22 to ground G, causes the voltage across resistance 1 to exceed a reference voltage.

Figure 4:
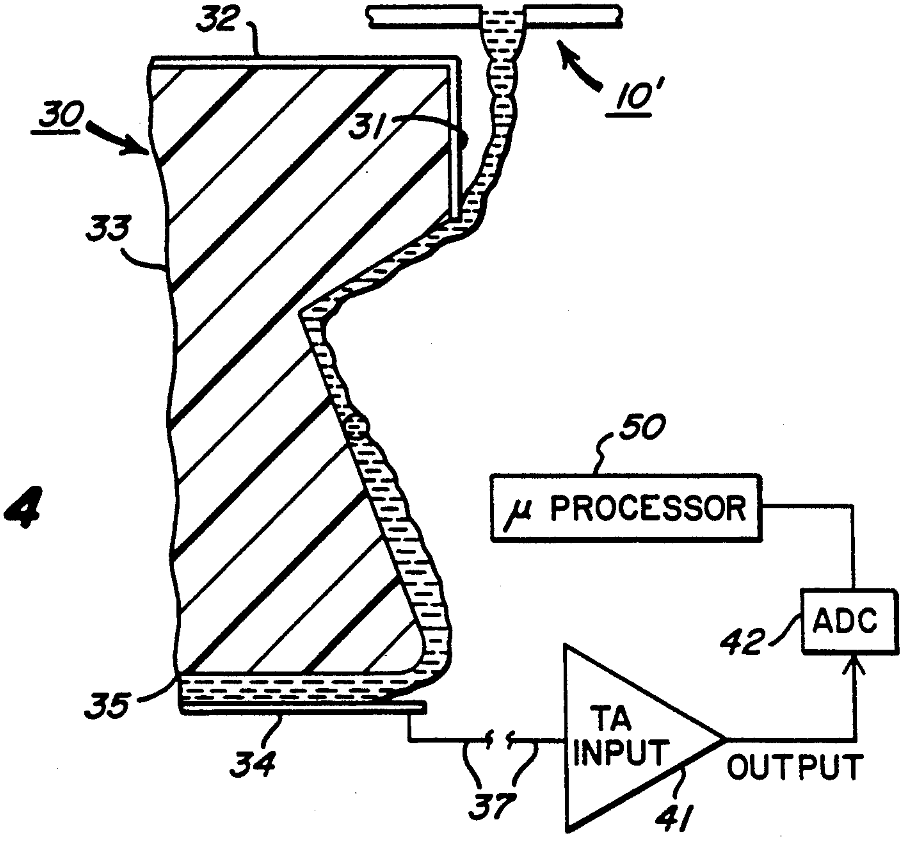
FIG. 4 is a side view of the FIG. 3 apparatus as it operates in a shorted circuit mode, where ink is impacting on the charging electrodes.

Referring now to FIGS. 3 and 4, there is shown schematically one preferred print head construction for practice of the present invention. In this embodiment, the drop ejection assembly 10 can be constructed in a known manner similar to FIG. 1. However, the lower print head assembly 30 comprises a dielectric body portion 33 on which charge electrodes 31 and leads 32 are formed or mounted. Additionally, an electrically conductive (e.g. metal) catch pan and detector portion 34 is provided at the bottom of the body portion 33, in a manner forming an ink discharge channel 35 leading back to the printer ink reservoir (not shown). Portion 34 is electrically connected to an electrometer 41 whose output is coupled to an analog to digital converter 42. The ADC provides digital signals, indicative of the varying voltage outputs of the electrometer, to printer microprocessor 50.

The operation of the present invention will become clear from the subsequent discussion of the operation of the printer in the nominal and short condition modes, shown respectively in FIGS. 3 and 4. Thus, as ink streams issue from the orifice plate and break up opposite the charge electrodes, a potential difference exists between the charging electrode 31 and the drop streams. The individual droplets become charged and deflected by electrostatic mechanisms so that they impact on the catcher face. When the catcher is made of an electrically insulating material, the charged droplets cause a current to flow through the ink on the catcher face to the metal catch pan 34.

The input terminal of a transresistance amplifier (electrometer) 41 is connected via lead cable 37 to the catch pan. This provides a path for the charged droplet current back to ground through the electrometer and the electrometer develops an output voltage proportional to the magnitude of the input current (i.e. it acts as a current-to-voltage converter). It is to be noted that when the charging electrodes are at a positive potential with-respect-to the ink jets, the droplets acquire an opposite polarity, negative charge by induction. Therefore, in the nominal FIG. 3 printing or phase test modes, the current created by the charged droplets is negative.

In accord with the present invention a jet impacting on the charge plate can be detected by predeterminedly monitoring the output of electrometer 41 during nominal printing conditions or even while all jets are in a catch mode. Specifically, as shown in FIG. 4, when a jet impacts on the charge electrodes 31 a continuous ink path is formed between a charge electrode 31 and the catch pan 34. This continuous ink path forms an electrical connection of modest resistance between the charge lead(s) and catch-pan. Since the charge leads are at a positive potential, the ink path connection forces a positive electrical current to flow into the input terminal of the electrometer 41. The electrometer is, however, constructed to measure only negative currents; and when the net current at the input is positive, the electrometer output is clamped at zero volts, regardless of the current magnitude. In response to the zero volts condition transmitted to microprocessor by ADC 42, a printer shut down is effected.

Since the typical value for the (negative) droplet current of nominal print head operation is on the order one microamp, it takes a short circuit (positive) current of only about one microamp to drive the electrometer output voltage to zero. Thus, the short detection system provided by the present invention is extremely sensitive, in comparison to prior art approaches. Moreover, the electrometer signal can be monitored by the printer software at all times (even during printing) for a non zero value.

Figure 5:
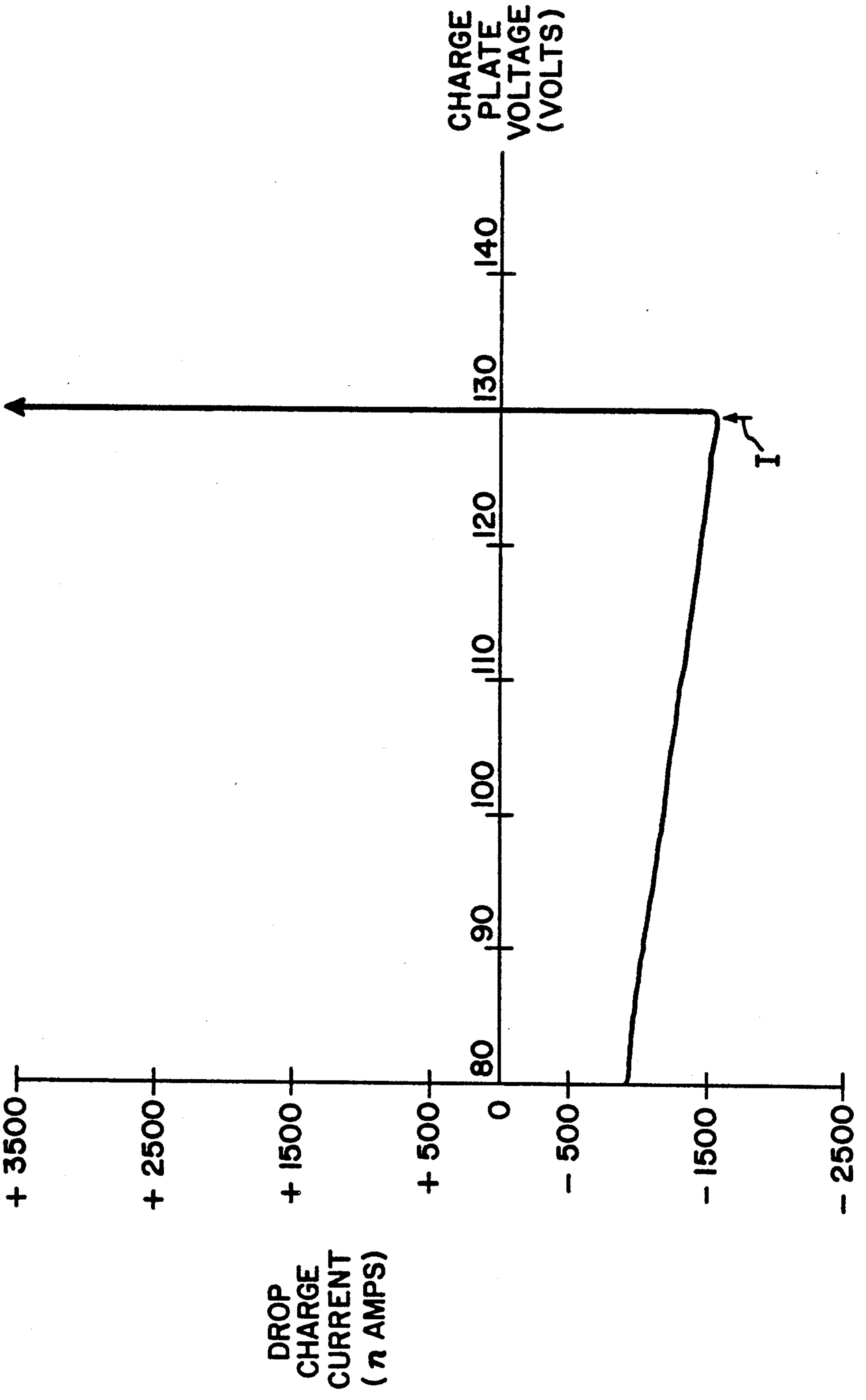
FIG. 5 is a plot of charge plate voltage versus detected drop charge current a printing apparatus is intentionally shifted from the FIG. 3 mode to the FIG. 4 mode.

The data plot of FIG. 5 shows the drop charge current of a print head such as shown in FIGS. 3 and 4 when in an all catch condition as a function of charge plate voltage. A print jet short condition was induced by increasing the charging electrode voltage until a jet impacted the charge plate, which occurred in this test at 130 vdc. As can be seen from the plot, the net jet current then exhibited a rapid change from about −1600 nanoamps to more than +3500 nanoamps just as the print jet short was produced. As will be appreciated, an electrometer 41 as in FIG. 3 would instantaneously signal a shut-down.

The invention has been described in detail with particular reference to certain preferred embodiments thereof, but it will be understood that variations and modifications can be effected within the spirit and scope of the invention.

I claim:

1. In a continuous ink jet printer of the kind having means for generating a plurality of droplet streams, a plurality of electrodes for selectively charging droplets of such streams and means for catching the charged, non print droplets, an improved detection system construction comprising:

(a) an electrically conductive sensor element located along an ink egress passage of said catching means;

(b) a dielectric surface formed along the drop impact region of said catching means, between said charge electrodes and said sensor element; and (c) signal means responsive to a charge polarity reversal output by said sensor for signalling a charge electrode short condition.

2. The invention defined in claim 1 wherein said signal means comprises electrometer means coupled to said sensor element for measuring the current of charged non-print drops caught by said catcher and means for detecting a zero output of said electrometer incident to charge flow of opposite polarity transmitted from said charge electrodes to said sensor via an ink coupling.

* * * * *